March 1, 1938.  E. A. JOHNSTON  2,109,667
POWER LIFT MECHANISM FOR TRACTORS
Filed March 24, 1937     4 Sheets-Sheet 1

Inventor
Edward A. Johnston
By (signature)
Att'y.

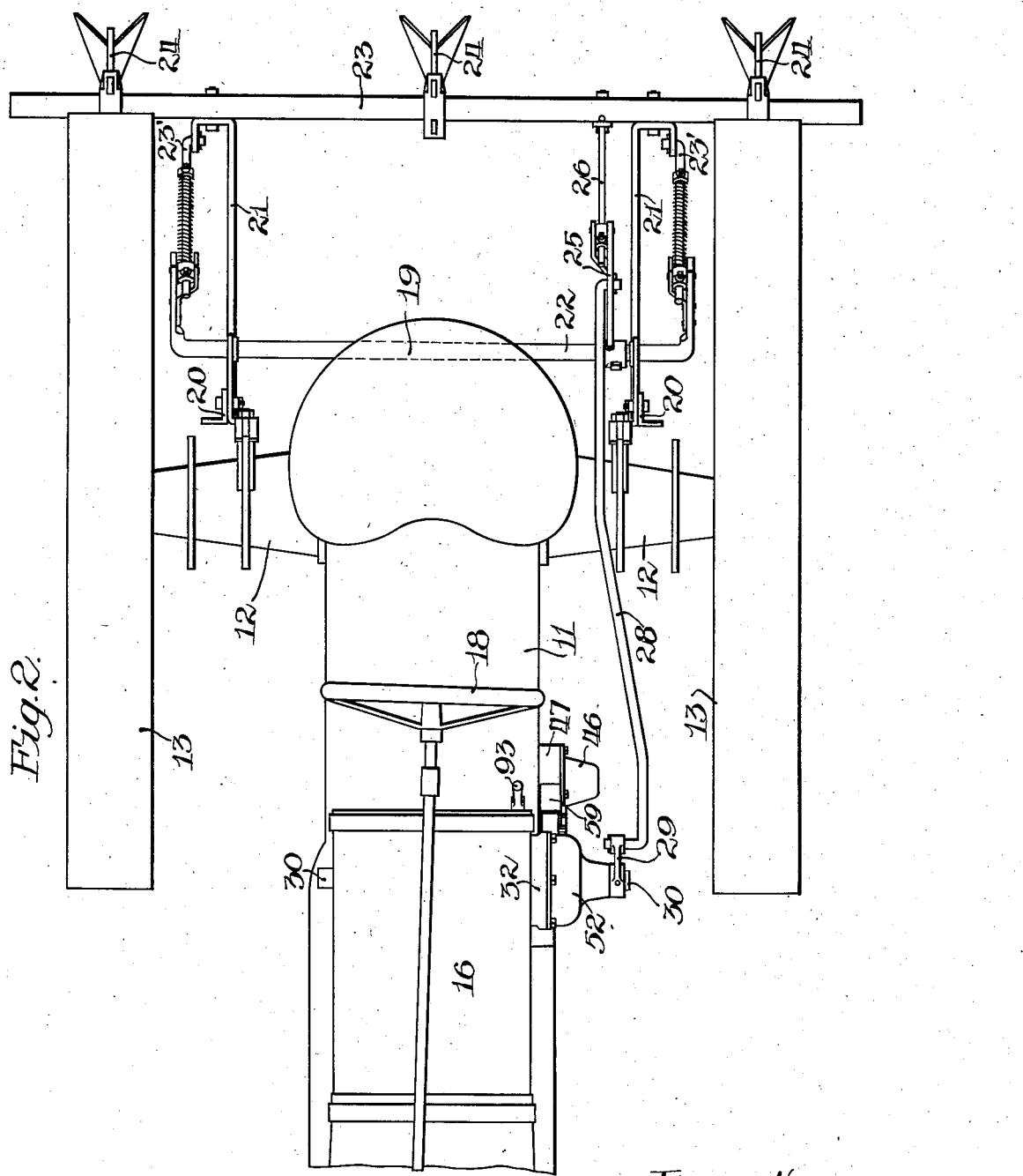

March 1, 1938.  E. A. JOHNSTON  2,109,667
POWER LIFT MECHANISM FOR TRACTORS
Filed March 24, 1937   4 Sheets-Sheet 3
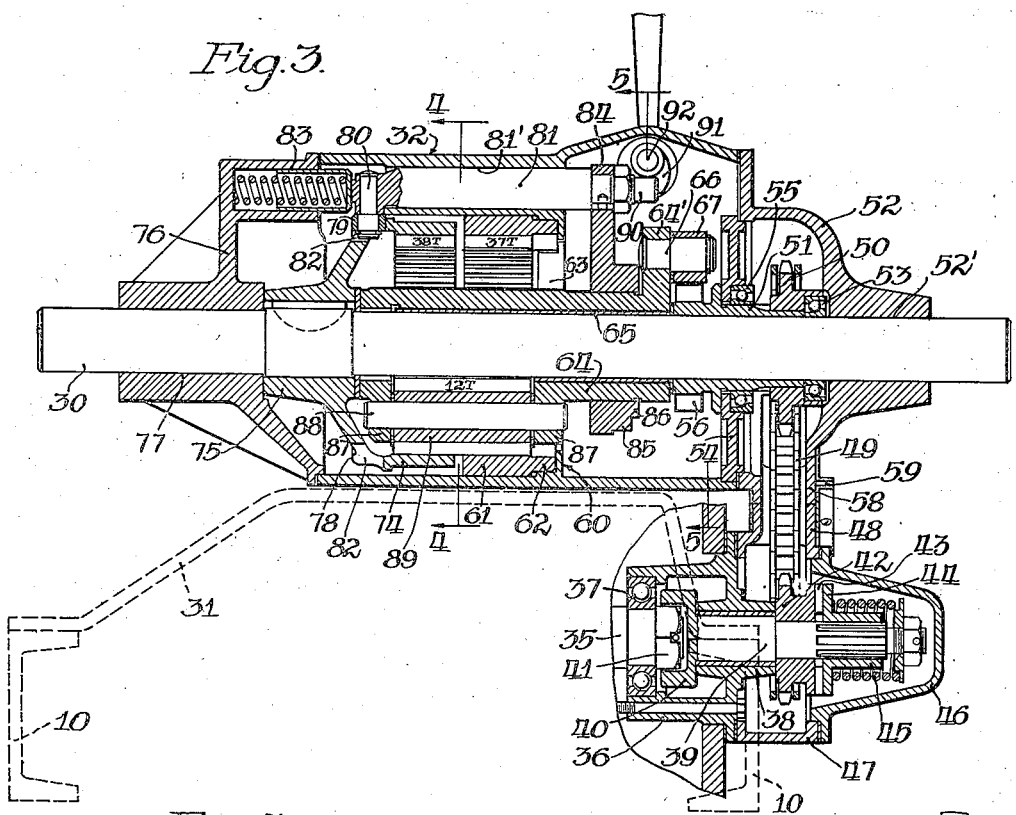
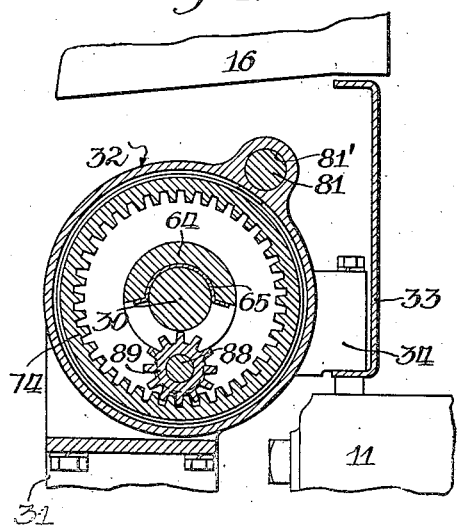
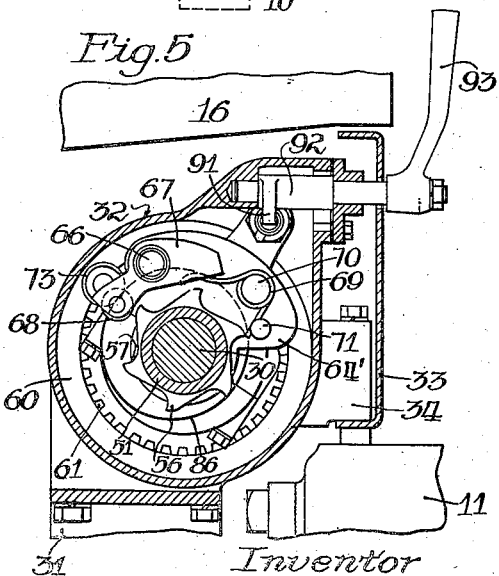
Inventor
Edward A. Johnston.
By *V. F. Guerque*
Att'y.

March 1, 1938. E. A. JOHNSTON 2,109,667
POWER LIFT MECHANISM FOR TRACTORS
Filed March 24, 1937 4 Sheets-Sheet 4

Inventor
Edward A. Johnston
By *[signature]*
Atty.

Patented Mar. 1, 1938

2,109,667

UNITED STATES PATENT OFFICE 2,109,667

POWER LIFT MECHANISM FOR TRACTORS

Edward A. Johnston, Chicago, Ill., assignor to International Harvester Company, a corporation of New Jersey Application March 24, 1937, Serial No. 132,672

12 Claims. (Cl. 97—50)

This invention relates to a power lift mechanism for tractors. More particularly it relates to a mechanical device adapted to be operated by the engine power of a tractor for lifting and lowering an implement connected to the tractor.

A principal object of the invention is the construction of a power lift mechanism having an automatic partial revolution power disconnecting means and a positive lock in any power disconnected position.

Another principal object is the provision in a partial revolution power lift device of a construction in which the speed reduction is between the power disconnecting means and the lifting shaft, whereby much smaller and cheaper parts may be utilized.

Another object is the adaptation of a planetary gear reduction to a power lift device for obtaining a simple large ratio reduction with a minimum of friction loss.

Another object is the provision of a simplified chain drive taken from a cross transmission shaft of the tractor.

Another object is to provide a construction in which the intermittent partial revolutions may be any number of degrees up to a complete revolution or may consist of several partial revolutions of a different number of degrees.

The above objects and others, which will be apparent from the detailed description to follow, are accomplished by a mechanism in which a continuously rotating member is driven from a shaft operated by the tractor engine. This member is rotatably mounted on a transverse lifting shaft to simplify the construction of the device and to make possible a lifting shaft extending transversely to each side of the tractor. A second member, rotatably mounted on the lifting shaft, carries a latch mechanism engageable with the continuously rotating member for transmitting power to a particular type of gear reduction mechanism. The gear reduction mechanism, illustrated in the drawings, consists of a stationary internal gear, a movable internal gear and a planetary pinion gear carried by the disengageable power transmitting member. By means of a slight variation in the number of teeth in the two internal gears, a large gear reduction may be simply and satisfactorily obtained. The movable planetary gear is rigidly secured to the lifting shaft. A control mechanism is provided for engaging and disengaging the ratchet drive simultaneously with positive locking of the lifting shaft and the movable gear carried thereby.

In the drawings:

Figure 2 is a plan view of the structure shown in Figure 1;

Figure 3 is a transverse section taken on the line 3—3 of Figure 1 to show the internal mechanism of the power lift device;

Figure 4 is a vertical section taken on the line 4—4 of Figure 3;

Figure 5 is a section taken on the line 5—5 of Figure 3;

Figure 1:
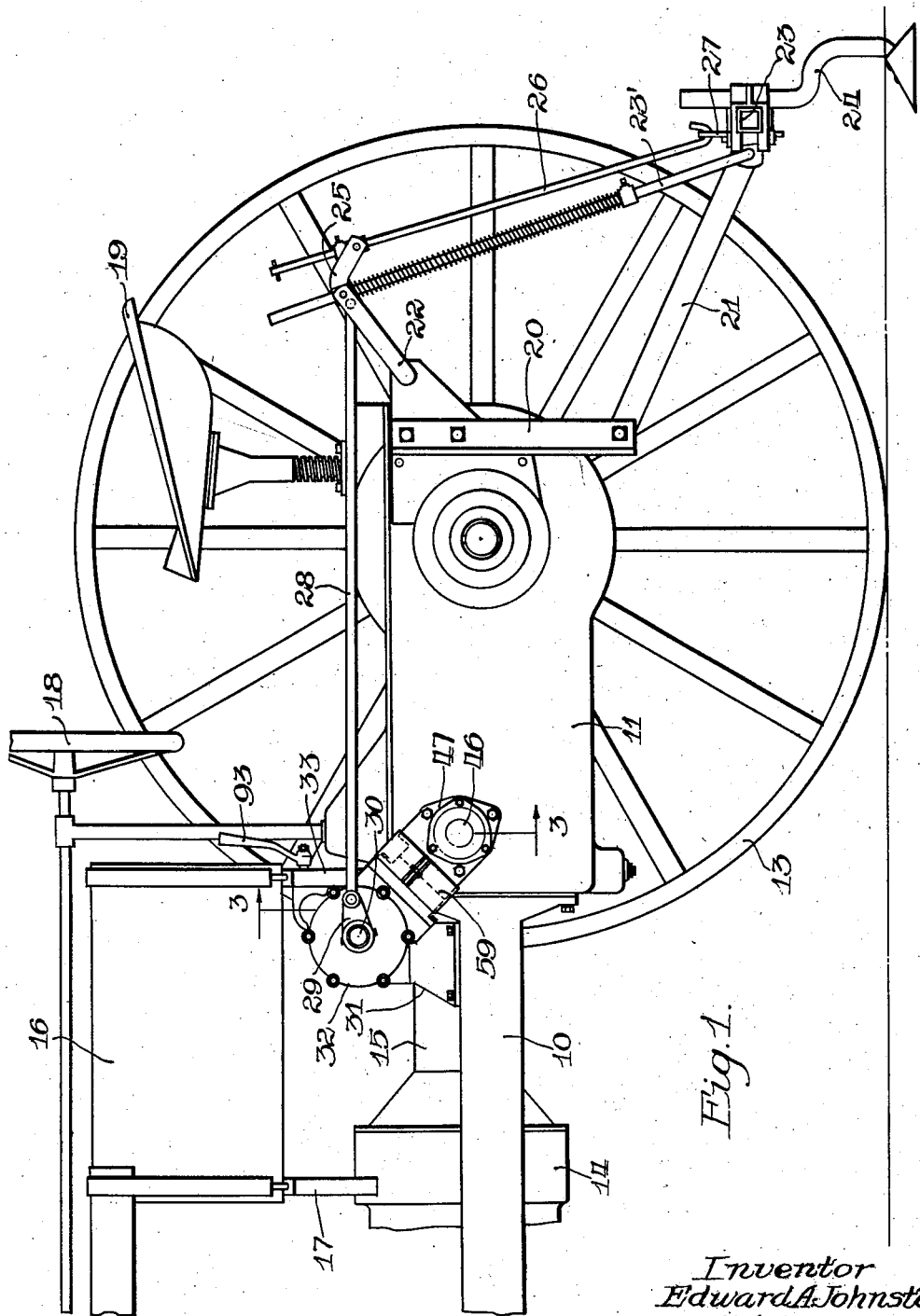
Figure 1 is a side elevation of the rear portion of a tractor with one of the rear wheels removed showing a representative installation of a power lift mechanism construction according to the invention.
Figure 6:
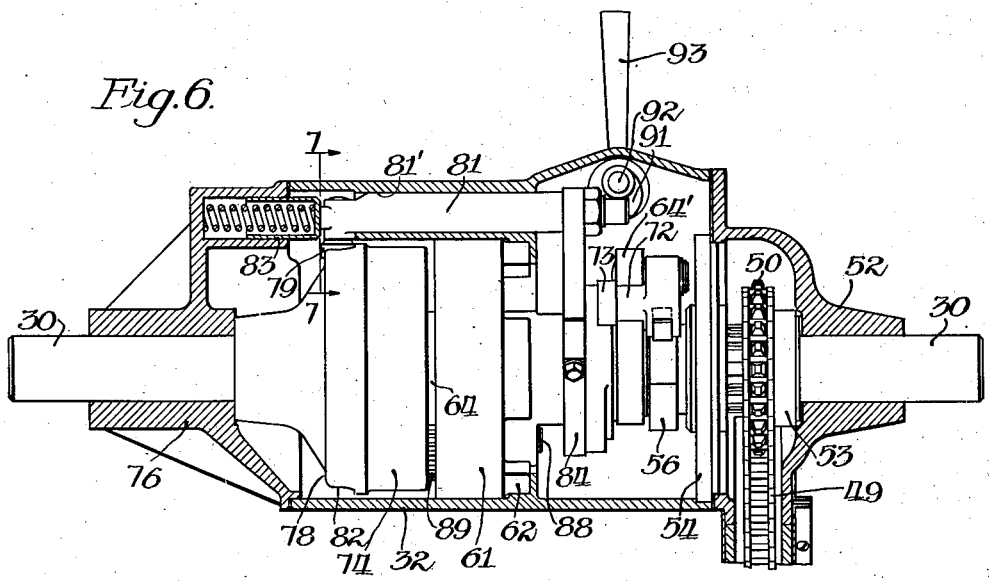
Figure 6 is the same section as Figure 3 of the casing containing the power lift mechanism with the internal mechanism shown in elevation.

A power lift mechanism incorporating the invention has been shown on a tractor with an attached implement in Figures 1 and 2 to illustrate the application of such a mechanism to a tractor. The tractor, as illustrated, has side frame members 10, a rear transmission and final drive housing 11, laterally extending axle housings 12 and drive wheels 13 mounted on the axles. A clutch housing 14 is also illustrated from which power is transmitted to the transmission by suitable means enclosed by a tunnel 15. A gasoline tank 16 is shown supported on brackets 17. A steering wheel 18 and an operator's seat 19 are shown at the proper locations on the tractor.

At the rear of the tractor, a frame structure 20 provides means for mounting implement supporting beams 21 and a transverse rockshaft 22. Said rockshaft is connected to a transverse implement supporting bar 23 carried by the beams 21 by means of spring pressed links 23'. Shanks 24 connected to the bar 23 illustrate means for carrying earth working implements.

The rockshaft 22 carries rigidly therewith a lifting lever 25, which is connected by a link 26 to a bracket 27 mounted on the bar 23. The lifting lever 25 is also connected by a link 28 with a crank 29 fixed on a lifting shaft 30, which forms the output shaft of the power lift mechanism to be hereinafter described.

As a support for the lifting mechanism, a transverse member 31 extends transversely of the tractor being mounted on the side frame members 10. Said member extends upwardly above the tunnel 15. On its flat upper side, the power lift casing 32 is rigidly secured by any suitable means, as best illustrated in Figures 4 and 5.

Referring to these figures, a transverse vertical sheet metal member 33, mounted on the transmission casing 11 below the gasoline tank 16, forms a means for mounting the casing 32 in a concealed position beneath the gasoline tank and in a location where it does not form an inconvenience to the operator or obstruct his vision. An extension 34 of the power lift casing extends rearwardly and over one of the flanges of the member 33, being rigidly secured to the casing 11 by a cap screw. This extension rigidly secures the power lift casing in position and takes the torque in both directions developed by operation of the lifting shaft 30.

In a tractor of the type disclosed, the transmission mechanism includes a transverse shaft 35, illustrated at the broken away section in Figure 3. To provide means for driving the power lift mechanism, the bearing support, normally used in the casing at one end of the shaft, is removed and a special bearing support 36 is substituted. Said support includes means for retaining a ball bearing assembly 37, which supports the end of the shaft and a journal 38, which rotatably supports a stub shaft 39. At its inner end, the shaft 39 is formed integrally with a recessed cap 40 engageable with a nut 41 forming a bearing retainer on the end of the shaft 35. At its outer end, the shaft 39 carries a chain sprocket 42 rotatably thereon. Said sprocket is formed at its outer end with a clutch face 43 engageable with a corresponding clutch face formed on a flange 44. The flange 44 is integrally with a sleeve 45 slidably and non-rotatably mounted on the shaft 39. Adjustable spring pressure means maintain the two clutch faces in engagement during normal operation and provide an over-load release.

A cupped cover 46 is secured to a casing 47. Said casing is secured to the bearing support 36 to form an enclosure for the drive sprocket and its associated parts. The casing 47 is provided with an upward extension 48 open to provide for an upwardly extending drive chain 49, which surrounds the sprocket 42 and provides means for driving a chain sprocket 50, rotatably mounted on the shaft 30.

The chain sprocket 50 is splined on a sleeve 51 rotatably mounted on the shaft 30. The open end of the main casing 32 is closed by a cover member 52, which is formed with a bearing portion 52' for one end of the lifting shaft 30. A ball bearing assembly 53, mounted on the shaft 30, provides a bearing for one end of the rotatable assembly formed by the sprocket 50 and the sleeve 51. A plate member 54, set into the casing between the end thereof and the cover member 52, forms a supporting means for a ball bearing assembly 55, which also supports the sleeve 51.

At the end opposite the chain sprocket, the sleeve 51 is formed integrally with a flange provided with a plurality of lugs 56. Said lugs are shaped to provide a cam surface on one side of their ends and a driving notch 57 opposite the cam surface. The operation of these lugs will be described in connection with the ratchet drive mechanism.

The cover member 52 is provided on the underneath side with a hollow tubular extension 58, which is in alignment with the extension 48 on the casing 47. These two extensions form a substantially continuous housing for the drive chain 49. A sheet metal member 59 is clamped around the two extensions, as best shown in Figure 1, to form a closed compartment. As shown in dotted lines of Figure 1, portions of the extensions may be broken away to form an inspection opening for observing the drive chain.

Substantially midway of the casing 32, an inwardly extending flange 60 is formed to provide an abutment for an internal gear 61, which is positioned in the casing from the opposite end against the flange 60. The gear 61 is provided with a plurality of circumferentially spaced arcuate lugs 62 which fit between corresponding lugs 63 formed around the interior of the casing adjacent the flange 60. By this means, the internal gear is held against rotation in the casing. A sleeve member 64, which provides a planetary gear carrier, is mounted within the main portion of the casing 32 on a bearing sleeve 65 for rotation on the lifting shaft 30. Said sleeve member is provided at one end adjacent the lugs 56 with a radial extension 64'. A pivot pin 66 fixed in said extension forms a pivotal mounting for a pawl or ratchet member 67. Said member is provided at one end with a roller 68 adapted to engage the notches 57 formed on one face of the lugs 56. The other end of the pawl 67 is extended to form an abutment against which a spring 69 reacts to urge the pawl into engagement with the lugs 56. The spring 69 is mounted on a pin 70, fixed to the extension 64'. A stop means is formed for the other end of the spring in the form of a pin 71 fixed to the extension 64'.

The pawl or ratchet member 67 is also provided with a lateral extension 72, which carries a roller 73 positioned axially beyond the extension 65. This roller, as will be hereinafter described, controls the throw-out and disengagement of the pawl 67.

An internal gear 74, positioned coaxially of the shaft 30 and lying adjacent the gear 61, is formed integrally with the hub portion 75, which is rigidly keyed to the shaft 30. A cover member 76, which closes the open end of the casing 32, is formed with a bearing portion 77 for rotatably supporting one end of the shaft 30. Said cover member entirely encloses the casing at this end.

Figure 7:
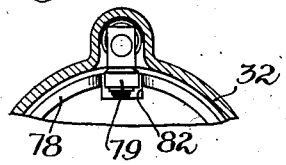
Figure 7 is a section taken on the line 7—7 of Figure 6.
Figure 8:
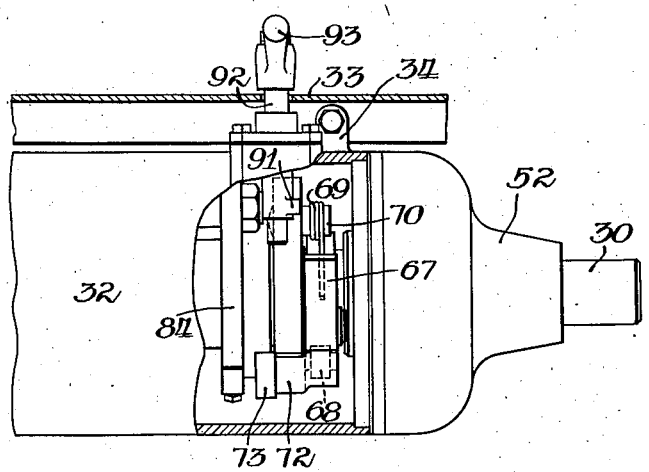
Figure 8 is a top plan view of the power lift casing with a portion of the top at one end broken away to show the drive mechanism in plan view.

The gear 74 is rigidly connected as an integral member with the hub 75. A rib 78 is formed around this structure to provide a track for locking roller 79. Said roller is rotatably carried on a pin 80 rigidly mounted on a reciprocable member 81. As illustrated, two notches 82 are formed in the gear member opening inwardly from the track rib 78 to provide two locations for seating of the locking roller 79. As shown in Figure 7, a substantial clearance is provided in the notches at each side of the roller 79.

The actuating member 81 is mounted for reciprocation in a transverse bore 81' formed in an integral extension of the casing wall. A spring pressed member 83 abuts one end of the member 81, acting to urge the locking roller 79 into the notches 82. At its other end, the member 81 is rigidly secured to a cam supporting member 84. Said member is provided with a bore which provides for mounting the member slidably along the sleeve 64. Around said sleeve, radial flange 85 of a uniform radius is formed integrally with the member 84. Said flange is in turn formed on its face with an eccentric cam 86, as best shown in elevation in Figure 5. Said cam is adapted at its low point to be slidable under the roller 73, carried by the pawl 67. As the pawl carrier rotates, the roller 73 rides the cam around to a high position thereby disengaging the roller 68 from the notches 57 and allowing the actuating member 81 to move in an axial direction of the shaft 30, as best shown in Figure 5, thereby seating the locking roller 79 in one of the notches 82. As soon as the roller 62 on the pawl 67 is disengaged, there is no longer any drive torque applied to the sleeve 64.

The sleeve member 64 carries axially aligned extensions 87 through which a pinion shaft 88 extends. A planetary pinion gear 89 rotatably mounted on said shaft engages the teeth on the fixed internal gear 65 and the rotatably internal gear 74.

The actuating member 81 has a reduced end portion 90 which is engaged by a cam lever 91 carried by an operating shaft 92. Said shaft is rotatably mounted in the casing extending outside the casing for actuation by means of a hand lever 93. It will be noted that the shaft extends through an opening provided in the transverse member 33 to bring the operating handle within reach of the tractor operator.

Certain features of the operation of the mechanical power lift device, as above described, have been explained in connection with the description of the parts. The complete operation will now be described in the sequence of operation.

By means of the connection with the continuously operating engine driven shaft 35, continuous rotation is applied to the chain sprocket 50 through the intermediate driving parts. The slip clutch formed between the flange 44 and the face 43 on the chain sprocket 42 provides an overload release means when a load is applied to the lifting shaft 30 with excess of a predetermined amount.

The sprocket 50, being splined on the sleeve 51, continuous rotation is applied to said sleeve and to the ratchet lugs 56 carried thereby. In the idle position of the lifting shaft, the actuating member 81 is in the position shown in the drawings with the locking roller 79 seated in one of the notches 82, formed in the rib 78, whereby the gear 74, its hub 75 and the lifting shaft 30 are locked in position.

When the operator desires to rotate the shaft 30 to lift or lower the implements connected thereto, the operating handle 93 is moved angularly to apply pressure in an axial direction against the member 81. The spring pressure applied through the member 83 is overcome, thereby moving the locking roller 79 out of the notches 82 with which it is engaged. Simultaneously, the cam supporting member 84 is moved axially away from the roller 73. When the support for this roller is thereby removed, the spring 69 moves the pawl member 67 with the roller 68 into engagement with one of the notches 57.

As the sleeve 51 is continuously driven, power is then applied to rotate the sleeve member 64 at the same speed as the sleeve 51. The pinion shaft 80 is then rotated around the lifting shaft with the planetary pinion 89 rotating around its own axis within the internal gears 61 and 74. This type of gear may be described as epicyclic as well as planetary. As shown by legends on the drawings in Figure 3, the pinion 89 is formed with twelve teeth, the internal gear 61 is formed with thirty-seven teeth, and the internal gear 74 is formed with thirty-eight teeth. With this tooth construction, for each rotation of the sleeve member 64 thereby carrying the pinion gear shaft 88 about the shaft 30, the movable gear 74, having one more tooth than the gear 61, is backed up an angular distance equivalent to one tooth. By corresponding reasoning, the gear 74 is backed up one complete revolution for thirty-eight revolutions of the pinion shaft 88 as it planets around the shaft 30. This type of gearing is a simple, compact, durable and powerful means of obtaining a high gear reduction.

After the shaft 30 has rotated a half revolution or any other angular distance for which a corresponding notch 82 has been provided, the spring pressure forces the locking roller 79 into the notch 82 which comes into registry therewith. The actuating member 81 moves axially whereby the cam 86 moves under the roller 73 and lifts the pawl roller 68 out of driving engagement with the ratchet lugs 56.

It will be understood that a partial revolution of the cam 86 will be required to lift the pawl out of engagement. For that reason, the notches 82 are formed of a width greater than the diameter of the locking roller 79 to allow for the movement following actuation of the member 81 and preceding disengagement of the pawl.

It will be noted that there is also a substantial reduction in speed between the drive shaft 35 and the sleeve 51 due to the sprocket 50 being of a larger diameter than the sprocket 42. This reduction together with the reduction obtained by the epicyclic gearing amounts to forming over fifty to one. It will be understood that lifting cranks may be applied to either end of the shaft 30. In Figures 1 and 2, a lifting crank 29 is shown on one end of the shaft, being connected to a lifting link 28. It will be understood that when the lift is tripped by actuation of the hand lever 93, the lifting crank 29 moves from the provision shown in Figures 1 and 2 to a position with the crank pin diametrically opposite, thereby lifting the implements out of soil engaging position.

As made clear in the description and explanation of the operation, the power engaging and disengaging means in this device are on the power input side of the gear reduction. As the parts at this side travel at a higher speed and therefore transmit less torque, comparatively small and inexpensive units may be utilized. At the output side of the gear reducion, the structure, which is required for transmitting of large torque is simple and durable and does not require any delicate moving parts, such as has been the case in power lift devices using half revolution clutches on the power output side of a gear reduction.

It is to be understood that applicant has shown and described only a preferred embodiment of his improved power lift device and that he claims as his invention all modifications falling within the scope of the appended claims.

What is claimed is:

1. A power lift device for tractors comprising, in combination, a casing on the tractor, a lifting shaft journaled in said casing, a pinion carrier rotatably mounted in the casing, disengageable means for rotating said carrier, a planetary pinion rotatably supported on said carrier, two gears mounted in the casing concentric with respect to the pinion carrier in engagement with the planetary pinion, said gears having different numbers of teeth whereby upon each revolution of the planet carrier one of said gears is rotated relative to the other, means for holding one gear fixed with respect to the casing, means for securing one gear for rotation with the lifting shaft, and releasable means for locking the ring gear secured to the shaft in position against rotation.

2. A power lift device for tractors comprising, in combination, a casing on the tractor, a lifting shaft journaled in said casing, a pinion carrier journaled in the casing disengageable means for rotating said carrier, a planetary pinion rotatably supported on said carrier, a gear in mesh with the pinion and mounted coaxially with the pinion carrier, a second gear in mesh with the pinion planet and mounted coaxially with the pinion carrier, said gears having different numbers of teeth whereby upon each revolution of the planet carrier one of said gears is rotated relative to the other, means for holding one gear fixed with respect to the casing, means for securing one gear for rotation with the lifting shaft, and releasable means for locking the ring gear secured to the shaft in position against rotation.

3. A power lift device for tractors comprising, in combination, a casing on the tractor, a lifting shaft journaled in said casing, a pinion carrier journaled in the casing concentric with respect to the lifting shaft, disengageable means for rotating said carrier, a planetary pinion journaled on said carrier, a gear concentric with respect to the shaft in mesh with said pinion, a second gear concentric with respect to the shaft in mesh with said pinion, said gears having different numbers of teeth whereby upon each revolution of the pinion carrier one of said gears is rotated relative to the other, means for fixing one gear to the casing, means for fixing one gear to the shaft, and releasable means for locking the ring gear fixed to the shaft in position against rotation.

4. A power lift device for tractors comprising, in combination, a casing on the tractor, a lifting shaft journaled in said casing, a pinion carrier rotatably mounted in the casing, driving means for rotating said carrier, disengaging means for rendering said means inoperative, a planetary pinion rotatably supported on said carrier, two gears mounted in the casing concentric with respect to the pinion carrier in engagement with the planetary pinion, said gears having different numbers of teeth whereby upon each revolution of the planet carrier one of said gears is rotated relative to the other, means for holding one gear fixed with respect to the casing, means for securing the other gear for rotation with the lifting shaft, releasable means for locking the gear secured to the shaft in position against rotation, and operating connections between said releasable means and the disengaging means operative to engage the driving means when the gear is unlocked and to disengage the driving means when the gear is locked.

5. A power lift device for a tractor having a motor comprising, in combination, a casing on the tractor, a lifting shaft journaled in said casing, a sleeve rotatably mounted on the lifting shaft, an internal gear fixed to the casing concentric with respect to the lifting shaft, a second internal gear fixed to the lifting shaft, a pinion rotatably carried by said sleeve on an axis parallel to and spaced from the lifting shaft, said pinion meshing with each of said internal gears, said internal gears having different number of teeth whereby upon each revolution of the pinion carrier sleeve the second ring gear is rotated a distance depending upon the teeth variations, releasable means for locking the second ring gear in position against rotation, and releasable driving means for the sleeve operatively connected to the tractor motor.

6. A power lift device for a tractor having a motor comprising, in combination, a casing on the tractor, a lifting shaft journaled in said casing, a sleeve rotatably mounted on the lifting shaft, an internal gear fixed to the casing concentric with respect to the lifting shaft, a second internal gear fixed to the lifting shaft, a pinion rotatably carried by said sleeve on an axis parallel to and spaced from the lifting shaft, said pinion meshing with each of said internal gears, said internal gears having different numbers of teeth whereby upon each revolution of the pinion carrier sleeve the second ring gear is rotated a distance depending upon the teeth variations, releasable means for locking the second ring gear in position against rotation, releasable driving means for the sleeve operatively connected to the tractor motor, and means operable with said locking means for controlling the driving means.

7. A power lift device for tractors comprising, in combination, a casing on the tractor, a lifting shaft journaled in said casing, a planet gear carrier rotatably mounted on the lifting shaft, a driving sleeve rotatably mounted on the lifting shaft, means for continuously rotating said sleeve, a planetary gear rotatably carried by the planet carrier on axis parallel to and spaced from the lifting shaft, an internal gear fixed to the casing concentric with respect to the shaft and engaged by the planetary gear, a second internal gear fixed to the lifting shaft and engaged with said planetary gear, said internal gears having different numbers of teeth whereby upon each revolution of the planet carrier the second ring gear is rotated a distance depending upon the teeth variations, releasable means for locking the second ring gear in position against rotation, and releasable driving connections between the sleeve and the planet gear carrier.

8. A power lift device for tractors comprising, in combination, a casing on the tractor, a lifting shaft journaled in said casing, a planet gear carrier rotatably mounted on the lifting shaft, a driving sleeve rotatably mounted on the lifting shaft, means for continuously rotating said sleeve, a planetary gear rotatably carried by the planet carrier on an axis parallel to and spaced from the lifting shaft, an internal gear fixed to the casing concentric with respect to the shaft and engaged by the planetary gear, a second internal gear fixed to the lifting shaft and engaged with said planetary gear, said internal gears having different numbers of teeth whereby upon each revolution of the planet carrier the second ring gear is rotated a distance depending upon the teeth variations, releasable means for locking the second ring gear in position against rotation, releasable driving connections between the sleeve and the planet gear carrier, and means operable with said locking means for actuating said connections.

9. A power lift device for tractors comprising, in combination, a casing on the tractor, a lifting shaft journaled in said casing, a sleeve rotatably mounted on the lifting shaft, disengageable means for rotating said sleeve, a pinion rotatably carried by said sleeve, a gear fixed to the casing concentric with respect to the shaft and engaged by the pinion, a second gear fixed to the lifting shaft and engaged with said pinion, said gears having different numbers of teeth whereby upon each revolution of the pinion carrier sleeve, the second ring gear is rotated a distance depending upon the teeth variations, and releasable means for locking the second ring gear in position against rotation.

10. A power lift device for tractors comprising, in combination, a casing on the tractor, a lifting shaft journaled in said casing, a sleeve rotatably mounted on the lifting shaft, disengageable means for rotating said sleeve, a pinion rotatably carried by said sleeve, a gear fixed to the casing concentric with respect to the shaft and engaged by the pinion, a second gear fixed to the lifting shaft and engaged with said pinion, said gears having different numbers of teeth whereby upon each revolution of the pinion carrier sleeve the second ring gear is rotated a distance depending upon the teeth variations, releasable means for locking the second ring gear in position against rotation, and means operable with said locking means for disengaging and engaging the sleeve driving means.

11. A power lift device for tractors comprising, in combination with a casing on the tractor, a lifting shaft journaled in said casing and extending laterally beyond each end thereof, a sleeve rotatably mounted on the lifting shaft, means for driving said sleeve from the tractor motor, a pinion carrier sleeve rotatably mounted on the lifting shaft and provided with a radial extension adjacent the end of the first mentioned sleeve, a ratchet member pivoted on said extension on an axis parallel to the axis of the lifting shaft, said member having a roller latch movable with the member toward and away from the first mentioned sleeve, a plurality of projections formed on the first mentioned sleeve providing notches engageable by the ratchet member, spring means for urging said ratchet member toward the notches, a cam member mounted eccentrically with respect to the second mentioned sleeve and being axially movable with respect thereto, said ratchet member being formed with a portion engageable with the cam to control engagement of the ratchet member, a pinion rotatably carried by the second sleeve on an axis parallel to and spaced from the lifting shaft, an internal ring gear fixed to the casing and engaged by the pinion, a second internal ring gear carried by the lifting shaft in mesh with said pinion, said internal gear having different numbers of teeth whereby upon each revolution of the pinion carrier sleeve the second ring gear is rotated a distance depending upon the tooth variations, said second ring gear being formed with circumferentially spaced notches, a releasable locking member engageable with said notches, said member being secured to the cam whereby the cam is moved to throw the ratchet into and out of driving position with the locking and unlocking of the gear.

12. A power lift device for tractors comprising, in combination with an engine driven shaft projecting laterally from the tractor, a casing mounted on the tractor frame extending transversely thereof forwardly of said power shaft, a lifting shaft journaled in said casing and extending laterally beyond each end thereof, a chain sprocket rotatably mounted on said lifting shaft within the casing, a chain sprocket mounted on the power shaft, a drive chain connecting said sprockets, a sleeve rotatably mounted on the lifting shaft and secured for rotation with the sprocket, a pinion carrier sleeve rotatably mounted on the lifting shaft and provided with a radial extension adjacent the end of the first mentioned sleeve, a ratchet member pivoted on said extension on an axis parallel to the axis of the lifting shaft, said member having a roller latch movable with the member toward and away from the first mentioned sleeve, a plurality of projections formed on the first mentioned sleeve providing notches engageable by the ratchet member, spring means for urging said ratchet member toward the notches, a cam member mounted eccentrically with respect to the second mentioned sleeve and being axially movable with respect thereto, said ratchet member being formed with a portion engageable with the cam to control engagement of the ratchet member, a pinion rotatably carried by the second sleeve on an axis parallel to and spaced from the lifting shaft, an internal ring gear fixed to the casing and engaged by the pinion, a second internal ring gear carried by the lifting shaft in mesh with said pinion, said internal gears having different numbers of teeth whereby upon each revolution of the pinion carrier sleeve the second ring gear is rotated a distance depending upon the tooth variations, said second ring gear being formed with circumferentially spaced notches, a releasable locking member engageable with said notches, said member being secured to the cam whereby the cam is moved to throw the ratchet into and out of driving position with the locking and unlocking of the gear.

EDWARD A. JOHNSTON.